US005603393A

United States Patent [19]

Ghode et al.

[11] Patent Number: 5,603,393

[45] Date of Patent: Feb. 18, 1997

[54] RATCHET HEAD ASSEMBLY AND REVERSING KNOB THEREFOR

[75] Inventors: Anil P. Ghode, Mundelein, Ill.; Martin S. Scolaro, Racine, Wis.

[73] Assignee: Snap-on Technologies, Inc., Crystal Lake, Ill.

[21] Appl. No.: 134,631

[22] Filed: Oct. 12, 1993

[51] Int. Cl.[6] ........ F16D 41/16

[52] U.S. Cl. ........ 192/43.2; 81/62; 81/63.1; 74/553; 16/DIG. 30

[58] Field of Search ........ 192/43, 43.1, 43.2; 16/121, DIG. 30, DIG. 40; 74/553; 81/62, 63.1, 63.2

[56] References Cited

U.S. PATENT DOCUMENTS

| | | | |
|---|---|---|---|
| 2,981,389 | 4/1961 | Kilness | 192/43.1 X |
| 2,982,148 | 5/1961 | Jackson et al. | 74/553 X |
| 2,982,161 | 5/1961 | Angquist et al. | 192/43.1 X |
| 3,044,591 | 7/1962 | Kilness | 192/43.1 |
| 3,467,231 | 9/1969 | Haznar . | |
| 4,211,127 | 7/1980 | D'Oporto et al. . | |
| 4,245,528 | 1/1981 | Hugh et al. . | |
| 4,307,632 | 12/1981 | Penner . | |
| 4,336,728 | 6/1982 | Deibert . | |
| 4,466,523 | 8/1984 | De Carolis et al. | 192/43.1 |
| 4,512,218 | 4/1985 | Chow . | |
| 4,520,697 | 6/1985 | Moetteli | 192/43.1 X |
| 4,612,830 | 9/1986 | Yang | 192/43.1 X |
| 4,765,449 | 8/1988 | Peters | 192/43.1 |
| 4,807,500 | 2/1989 | Main | 81/63.1 |
| 5,178,047 | 1/1993 | Arnold et al. . | |
| 5,197,161 | 3/1993 | Howie, Jr. | 74/553 X |
| 5,245,886 | 9/1993 | Truesdell et al. | 74/553 X |
| 5,266,991 | 11/1993 | McAtee, Jr. | 74/533 X |

OTHER PUBLICATIONS

Snap–on Tools Catalog, p. 206 (1993).

Polaroid photographs and parts list of Bluepint Ratchet, Model No. AT700C.

Brochure for Ingersoll–Rand Reactionless Ratchet, Model No. 110 (1988).

Article by J. Robert Merhar, copyright by Penton/IPC, Inc. (1984).

*Primary Examiner*—Andrea L. Pitts
*Attorney, Agent, or Firm*—Emrich & Dithmar

[57] ABSTRACT

A ratchet head assembly has a reversing knob with a metal shaft coupled to the pawl assembly of the ratchet mechanism and an enlarged-diameter plastic head insert molded around the outer end of the shaft and having a diameter two to three times that of the shaft and a density no greater than about one-fifth that of the shaft. Thus, the reversing knob has a low inertia so that it is not susceptible to self-reversing or self-locking during operation of the ratchet mechanism.

6 Claims, 1 Drawing Sheet

RATCHET HEAD ASSEMBLY AND REVERSING KNOB THEREFOR

BACKGROUND OF THE INVENTION

1. Field of the Invention

The present invention relates to ratchet heads and, in particular, to power-operated ratchet heads and, more specifically, to selector knobs for controlling the direction of operation of the ratchet mechanism.

2. Description of the Prior Art

Reversible ratchet heads are provided with a reversing knob or lever which is typically rotatable between forward and reverse positions to control the direction of rotation of the ratchet mechanism. Typically, the reversing knob is a metal member having a cylindrical shank with an enlarged head, the knob being rotatable about the axis of the shank to effect the direction-reversing function. The ratchet mechanism could be used in either a hand-operated or a power driven device. One such power driven device is an air ratchet tool sold by Snap-on Tools Corporation under Model No. FAR72B.

It has been found that in such prior ratcheting devices, particularly in power driven devices, the reversing knob has a tendency to self-reverse and/or self-lock under certain operating conditions. One such condition is during the rapid rundown of a loose fastener. In this mode of operation the drive body assembly of the ratchet head is torquing at a high rate of speed. The sudden stoppage caused by the fastener bottoming out causes rapid deceleration. The drive body comes to rest due to a drag brake acting on the drive body. However, because of its relatively high inertia, the large-head selector knob has a tendency to keep turning, moving to its other position and reversing the direction of operation of the ratchet mechanism.

Also, when the ratchet device is being used in a hand ratcheting mode, such as for loosening a fastener with a long extension, the sudden loosening or release of the fastener causes a rapid acceleration. Again, the inertia of the reversing knob tends to result in a relative movement between it and the drive body, which can result in self-reversal.

Many ratcheting devices, such as the Snap-on Tools FAR72B, described above, utilize two pawls. During self-reversal, if both pawls change direction, the ratchet mechanism reverses its direction of operation, but if only one pawl reverses its position, a self-locking condition results.

At least one prior art device has attempted to alleviate this self-reversing and/or self-locking tendency by reducing the size of the reversing selector knob. However, in order to overcome the self-reversing problem it has been found necessary to make the selector knob so small that manual operation becomes very difficult. Indeed, in certain such devices use of a needle nose pliers is required to effect manual operation of the selector knob. Other devices have attempted to address the problem by utilizing a latching-type selector knob which must be axially depressed before it can be rotated. Such an arrangement requires the use of additional parts and it is expensive to manufacture and complex to assemble.

SUMMARY OF THE INVENTION

It is a general object of the invention to provide an improved ratcheting device which avoids the disadvantages of prior ratchet mechanisms while affording additional structural and operating advantages.

An important feature of the invention is the provision of a ratchet head of the reversible type which minimizes the tendency to self-reversing or self-locking, In connection with the foregoing feature, another feature of the invention is the provision of a ratchet head of the type set forth in which the reversing mechanism is characterized by ease of manual operation.

Yet another provision of the invention is the provision of a reversing knob for use with a ratchet head of the type set forth.

In connection with the foregoing features, a further feature of the invention is the provision of a ratchet head having a relative low mass and low inertia.

These and other features of the invention are attained by providing a reversible ratchet head assembly comprising: a body, ratchet mechanism mounted in the body and including a pawl assembly and an output shaft engageable with the pawl assembly and rotatable relative to the body, and a reversing member coupled to the pawl assembly and selectively rotatable about an axis of rotation between forward and reverse positions for actuating the pawl assembly to control the direction of rotation of the output shaft, the reversing member including an elongated metal shank portion having an inner end disposed within the body for coupling to the pawl assembly and an outer end projecting from the body, the reversing member including an enlarged head portion integral with the shank portion and formed of a non-metallic material having a density substantially less than that of the shank portion, the outer end of the shank portion being embedded in the head portion.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
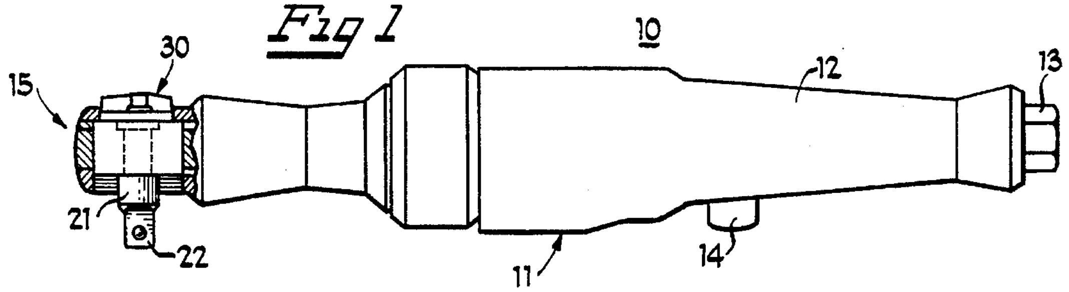
FIG. 1 is a side elevational view in partial section of an air-operated ratchet tool having a ratchet head constructed in accordance with and embodying the features of present invention.

Referring to FIG. 1, there is illustrated an air ratchet tool, generally designated by the numeral 10, having an elongated generally cylindrical housing 11 which houses an air motor and associated drive mechanism in a known manner. The housing 11 has a handle portion 12 provided at one end thereof with a coupler 13 for connection to an associated source of drive fluid, such a compressed air or the like, and a trigger 14 to control a valve for actuating the air motor. Carried by the distal or forward end of the housing 11 is a ratchet head 15.

Figure 2:
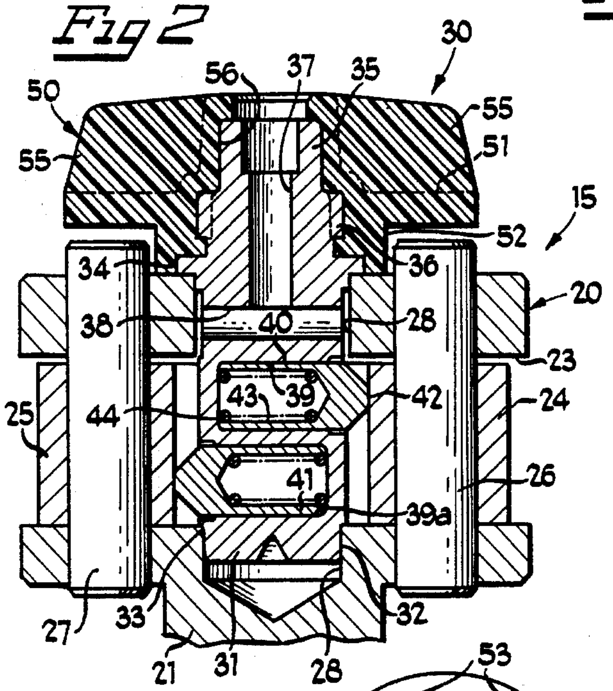
FIG. 2 is an enlarged, fragmentary view in vertical section of the ratchet head of the tool of FIG. 1.
Figure 3:
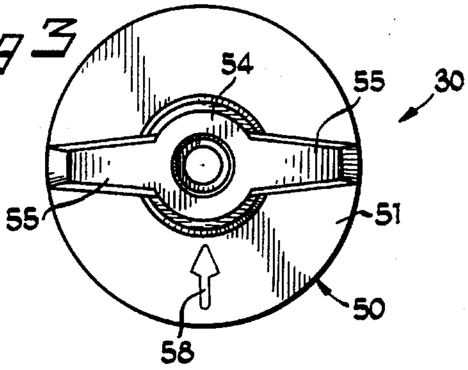
FIG. 3 is a top plan view of the reversing knob of the ratchet head of FIG. 2.
Figure 4:
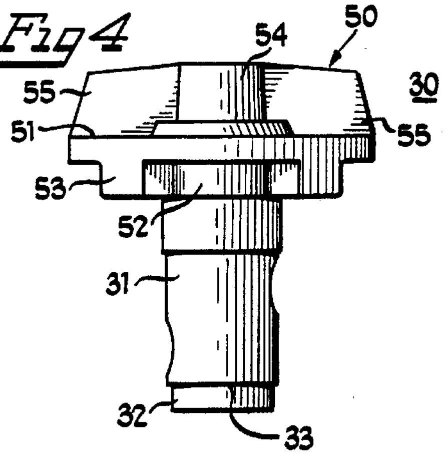
FIG. 4 is a front elevational view of the reversing knob of FIG. 3.
Figure 6:
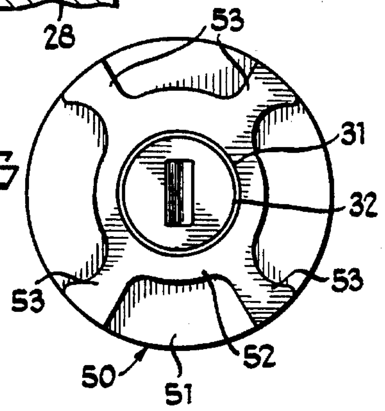
FIG. 6 is a bottom plan view of the reversing knob of FIG.
Figure 5:
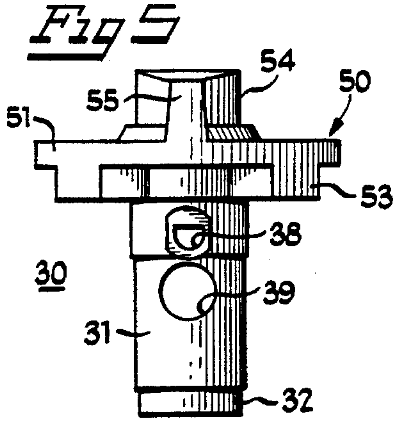
FIG.5 is a side elevational view of the reversing knob of FIG. 3, as viewed from the right-hand side thereof.

Referring also to FIG. 2, the ratchet head 15 includes a drive body 20 which is generally cylindrical in shape and has an output shaft 21 projecting axially from one end thereof and carrying a drive lug 22. A lateral slot 23 is formed in the side of the drive body 20 and carries a pair of pawls 24 and 25, respectively mounted for pivotal movement about pivot pins 26 and 27, which are respectively seated in bores in the drive body 20. Also formed in the drive body 20 is an axial bore 28 which is substantially parallel to the pivot pin bores and extends into the side of the drive body opposite the lug 22, communicating with the slot 23 and extending a slight distance into the output shaft 21.

The ratchet head 15 also includes a reversing knob 30 constructed in accordance with and embodying the features of the present invention. The knob 30 has an elongated, substantially cylindrical shank 31 which is formed of a suitable metal and is dimensioned to be received in the bore 28. The shank 31 has a reduced diameter end 32 which defines an annular shoulder 33 which is adapted to be seated on the rim of the bore 28 where it intersects the bottom of the slot 23. The shank 31 is also provided with a radially outwardly extending circumferential flange 34 adjacent to the other end thereof, adapted to be seated against the outer surface of the drive body 20, for cooperation with the shoulder 33 accurately to position the shank 31 coaxially in the drive body bore 28, as is illustrated in FIG. 2. The shank 31 also has a reduced-diameter outer end 35 provided with a plurality of radially outwardly extending and circumferentially spaced apart ribs 36. An axial bore 37 is formed in this reduced outer end 35 and communicates with a diametral bore 38 which passes through the shank 31 just below the flange 34.

Also formed in the shank 31 are a pair of radial bores 39 and **39*a* which extend from opposite sides of the shank 31. Respectively slidably received in the bores 39 and 39*a* are two cylindrical actuator pins 40 and 41, each having a generally frustoconical nose portion 42 which projects radially outwardly from the shank 31 for engagement with the associated one of the pawls 24 and 25. Each pin 40 and 41 has an axial bore 43 formed in the end thereof opposite the nose 42 and receives a helical compression spring 44 for resiliently urging the pin radially outwardly against the associated pawl. It will be appreciated that, as the reversing knob 30 is rotated about the axis of the shank 31, the actuator pins 40 and 41 cam the pawls 24 and 25** between their forward and reverse conditions, all in a known manner.

The reversing knob 30 also has an enlarged-diameter head 50, which includes a substantially circular disc 51 arranged coaxially with the shank 31 and having a lower hub portion 52 depending therefrom and provided with four substantially equiangularly spaced-apart and radially outwardly extending stiffening arms 53. Also projecting upwardly from the disc 51 is a substantially cylindrical turret 54 provided with radially outwardly extending wings 55 at diametrically spaced-apart locations thereof. An axial bore 56 is formed through the head 50 having a plurality of counterbores arranged so as to matingly receive the reduced diameter end 35 and the flange 34 of the shank 31. An indicium 58 may be formed on the upper surface of the disc 51 to indicate whether the reversing knob 30 is in its forward or reverse position.

It is a significant aspect of the invention that the head 50 is formed of a plastic material and is insert molded around the reduced diameter end 35 of the shank 31. In this regard, it will be appreciated that the ribs 36 serve to effectively prevent any relative rotational movement between the head 50 and the shank 31. Thus, there is provided a firm and rigid integral coupling between the head 50 and the shank 31.

As can be seen from the drawings, the head 50 has an outer diameter which is substantially greater than that of the shank 31, and preferably two to three times the diameter of the shank 31. Also, the wings 55 have a substantial height, so as to facilitate easy manual grasping and manipulation of the head 50 by a user to facilitate movement of the reversing knob 30 between its forward and reverse positions. It is also a significant aspect of the invention that the head 50 is formed of a material which has a density substantially less than that of the shank 31. In particular, the density of the head 50 is in the range of from about ⅕ to about 1/10 that of the shank 31.

In the preferred embodiment, the shank is formed by "metal injection molding." In that technique powdered metal is mixed with plastic and the mixture is injection molded and, after molding, the plastic part removed, either by solvent extraction or thermal breakdown upon heating the part to a predetermined temperature. However, the resulting shank 31 may retain about 5% porosity. Then, the shank 31 is insert molded in the plastic head 50, which may be formed of a suitable nylon material, such as that sold by E.I. Du Pont de Nemours and Company under the designation Nylon ST-801. The shank may have a density in the range of from about 7.4 grams per cubic centimeter to about 7.8 grams per cubic centimeter, while the head 50 has a density in the range of from about 0.9 grams per cubic centimeter to about 1.4 grams per cubic centimeter. In a constructional model of the invention, the head 50 has a density of 1.08 grams per cubic centimeter and the shank 31 has a density of 7.4 grams per cubic centimeter, so that the ratio of shank density to head density is approximately 6.5 to 1.

There results a reversing knob 30 which has a total mass of about 9 grams, as compared with a prior art all-metal reversing knob of substantially the same size and shape, which had a mass of about 22 grams. This substantially reduced mass and density of the reversing knob 30, and particularly of the head 50, results in a reversing knob of sufficiently low inertia to effectively prevent self-reversing or self-locking.

From the foregoing, it can be seen that there has been provided an improved ratchet head and, in particular, an improved reversing knob therefor, which is of simple and economical construction, while being characterized by low mass and inertia so as effectively to prevent self-reversing and self-locking, particularly in power driven applications.

We claim:

1. A reversible ratchet head assembly comprising: a body, ratchet mechanism mounted in said body and including a pawl assembly and an output shaft engageable with said pawl assembly and rotatable relative to said body, and a reversing member coupled to said pawl assembly and selectively rotatable about an axis of rotation between forward and reverse positions for actuating said pawl assembly to control the direction of rotation of said output shaft, said reversing member including an elongated metal shank portion having an inner end disposed within said body for coupling to said pawl assembly and an outer end projecting from said body, said reversing member including an enlarged head portion integral with said shank portion and formed of a non-metallic material having a density substantially less than that of said shank portion, said outer end of said shank portion being embedded in said head portion, said shank portion being substantially circularly cylindrical in shape and said head portion being circular in shape, said head portion being coaxial with said shank portion and having an outer diameter substantially greater than an outer diameter of said shank portion, the ratio of the density of said shank portion to the density of said head portion being between 5 and 10, whereby said reversing member has a rotational inertia substantially less than an all-metal reversing member of the same size and shape.

2. The ratchet head assembly of claim 1, wherein the ratio of the outer diameter of said head portion to the outer diameter of said shank portion is between 2 and 3.

3. The ratchet head assembly of claim 1, wherein said ratio is approximately 6.5.

4. The ratchet head assembly of claim 1, wherein said shank portion has a density in the range of from about 7.4 grams per cubic centimeter to about 7.8 grams per cubic centimeter, said head portion having a density in the range of from about 0.9 grams per cubic centimeter to about 1.4 grams per cubic centimeter.

5. The ratchet head assembly of claim 1, wherein said head portion is formed of a plastic material.

6. The ratchet head assembly of claim 5, wherein said head portion is formed of nylon.

* * * * *